(12) United States Patent
Holmes et al.

(10) Patent No.: US 7,628,418 B1
(45) Date of Patent: Dec. 8, 2009

(54) LOW PROFILE DOLLY TRAILER FOR HAULING LARGE CYLINDRICAL OBJECTS

(75) Inventors: Cecil E. Holmes, Hudson, IA (US); James R. Holmes, Hudson, IA (US)

(73) Assignee: Holmes & Holmes, Ltd., Hudson, IA (US)

( * ) Notice: Subject to any disclaimer, the term of this patent is extended or adjusted under 35 U.S.C. 154(b) by 463 days.

(21) Appl. No.: 11/306,938

(22) Filed: Jan. 17, 2006

(51) Int. Cl.
*B60P 3/22* (2006.01)
(52) U.S. Cl. ............................ 280/404; 280/408; 280/2; 280/830; 220/562
(58) Field of Classification Search ................ 280/408, 280/404, 830, 2; 220/562
See application file for complete search history.

(56) References Cited

U.S. PATENT DOCUMENTS

| | | | | |
|---|---|---|---|---|
| 2,340,628 | A | * | 2/1944 | Theriault .................... 280/837 |
| 2,772,892 | A | | 12/1956 | Hake et al. |
| 2,919,928 | A | | 1/1960 | Hoffer |
| 3,438,652 | A | | 4/1969 | Hoffacker |
| 3,784,221 | A | | 1/1974 | Frasier, Sr. |
| 3,860,257 | A | | 1/1975 | Mesly |
| 4,395,052 | A | * | 7/1983 | Rash .......................... 280/837 |
| 4,558,886 | A | | 12/1985 | Straub |
| 4,762,192 | A | * | 8/1988 | Maxwell .................... 180/14.2 |
| 4,943,078 | A | * | 7/1990 | McGhie et al. ............. 280/408 |
| 5,201,629 | A | | 4/1993 | Simpson et al. |
| 5,211,518 | A | | 5/1993 | Mimica |
| 5,370,414 | A | | 12/1994 | Tucker |
| 5,622,116 | A | | 4/1997 | Carlton |
| 6,189,723 | B1 | * | 2/2001 | Davis et al. ................. 220/586 |
| 6,190,100 | B1 | | 2/2001 | Mawji |
| 6,371,505 | B1 | * | 4/2002 | Turner, II ................. 280/441.2 |
| 6,786,689 | B2 | | 9/2004 | Dorris |
| 6,916,037 | B2 | * | 7/2005 | Baxter et al. ................ 280/683 |
| 7,108,285 | B2 | * | 9/2006 | Stobart ....................... 280/838 |

OTHER PUBLICATIONS

Trail King, engineering drawing No. 063780, it is unknown whether this drawing was ever published.
Trail King, engineering drawing No. 004480, it is unknown whether this drawing was ever published.
Nelson Manufacturing Company drawing, dated Dec. 20, 2004.
Nelson Manufacturing Company quotation to Dysart Trucking, dated Dec. 28, 2004.
Holmes Welding & Fabrication quotation to Dysart Trucking, dated Jan. 12, 2005.
List of parts from Sadler Power Train, dated Jan. 10, 2005.
Hand sketches drawn by Randy Winkelpleck, undated, but given to Nelson Manufacturing sometime before Dec. 20, 2004.

* cited by examiner

*Primary Examiner*—Lesley D. Morris
*Assistant Examiner*—Marlon A Arce
(74) *Attorney, Agent, or Firm*—Ryan N. Carter

(57) ABSTRACT

A dolly trailer adapted to transport heavy elongated cylindrical objects such as towers used to support energy generating windmills. The dolly trailer comprises a first side rail member and a second side rail member with a plurality of curved support members therebetween adapted to receive the cylindrical load. The curvature of the support members is such that at least a portion of the curved support members extends below the plane created by top surface of the dolly trailer's first and second side rail members so that in use at least a portion of the cylindrical load is carried below this plane.

11 Claims, 6 Drawing Sheets

LOW PROFILE DOLLY TRAILER FOR HAULING LARGE CYLINDRICAL OBJECTS

BACKGROUND OF THE INVENTION

This invention relates to vehicle dolly trailers adapted to haul large elongated loads. More particularly, this invention relates to a low profile dolly trailer for transporting elongated cylindrical loads at a level close to the ground.

Increasingly, massive structures must be moved from manufacturing sites to construction areas over state and federal highways. Because of road safety, state and federal authorities have adopted highway weight and length regulations which determine legal load limits for load carrying vehicles, the manner in which the load carrying vehicles may traverse a highway, and the weight distribution of load-carrying vehicles over the pavement. Loads exceeding the regulated weight or length limits often require special permits from state authorities. Although criteria for these permits may vary from state to state, the load-carrying vehicles must normally comply with a formula determined by the government authorities for safe travel across highways. Applying for and receiving these permits may delay transportation of the load which in turn negatively effects the construction project.

Dolly trailers are the vehicle of choice for transporting long heavy objects since they widely distribute the load over the roads. Examples of dolly trailers are described in U.S. Pat. Nos. 5,370,414, 4,762,192, and 3,438,652. Dolly trailers typically have a front assembly which supports the front portion of the load and a rear assembly which supports the rear portion of the load. The front and rear assemblies have an elevated frame. Bolsters are placed on the elevated ends to support the load. A drawback to these types of dolly trailers is that they elevate the load which gives it a high center of gravity so that the load has a tendency to wobble and turn over during the hauling operations. Another problem with this type of dolly trailer is that the raised load may not have the clearance to pass under some low lying obstacles such as bridges, thereby impeding the load's path and forcing the dolly trailer to detour around the obstacle.

Therefore, there is a need for a dolly trailer able to transport large cylindrical objects with reduced wobble and greater stability. Further, there is a need for a dolly trailer able to haul large cylindrical objects at a lever closer to the ground to permit the objects to pass under low lying obstacles.

SUMMARY OF THE INVENTION

The present invention is a dolly trailer adapted to transport a heavy elongated cylindrical object, such as a tower used to support an energy generating windmill. The dolly trailer comprises a frame having a first side rail member, a second side rail member, and a plurality of axles having wheels combined therewith. The dolly trailer frame further comprises a plurality of curved support members extending from the first side rail member to the second side rail member. The curved support members are adapted to receive the cylindrical load. The curvature of the support members is such that at least a portion of the curved support members extends below the plane created by the top surface of the dolly trailer's first and second side rail members so that in use, at least a portion of the cylindrical load is carried below this plane. The positioning of the cylindrical load in the curved support members allows the dolly trailer to have a lower center of gravity because at least a portion of the load is carried in-between the frame side rails, which helps the dolly trailer remain stable as it is carrying the load. Further, the positioning of the curved support members allows the load to sit lower in the frame which means the distance from the ground to the top of the load will be shorter, and, therefore be able to be carried under more low lying obstacles such as bridges and power lines.

At least one of the rear axles on the dolly trailer is a caster axle. The caster axles allow the wheels to pivot as the trailer turns which helps to reduce lateral force and helps the dolly trailer to have a shorter turning radius. The caster axles are lockable so that when there is no load being carried by the dolly trailer, the caster axles can be locked in their straight position so that they are no longer allowed to pivot.

DESCRIPTION OF THE PREFERRED EMBODIMENT OF THE INVENTION

Figure 1:
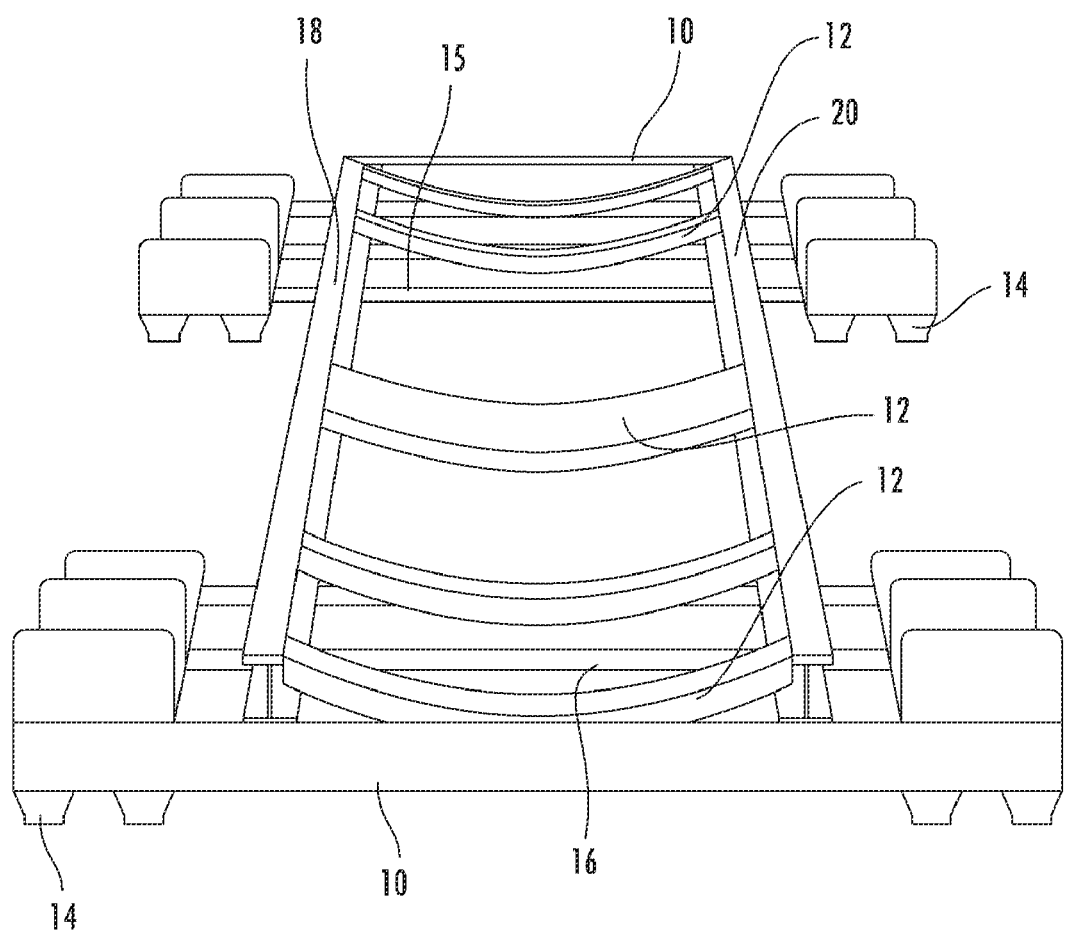
FIG. 1 is a perspective view showing the dolly trailer of the present invention.

With reference to FIGS. 1-6, the present invention is a dolly trailer adapted to transport a heavy elongated cylindrical object 22 such as a tower used to support an energy generating windmill. The dolly trailer comprises a frame 10 having a first side rail member 18, a second side rail member 20, and a plurality of axles 15, 16 having wheels 14 combined therewith.

Figure 2:
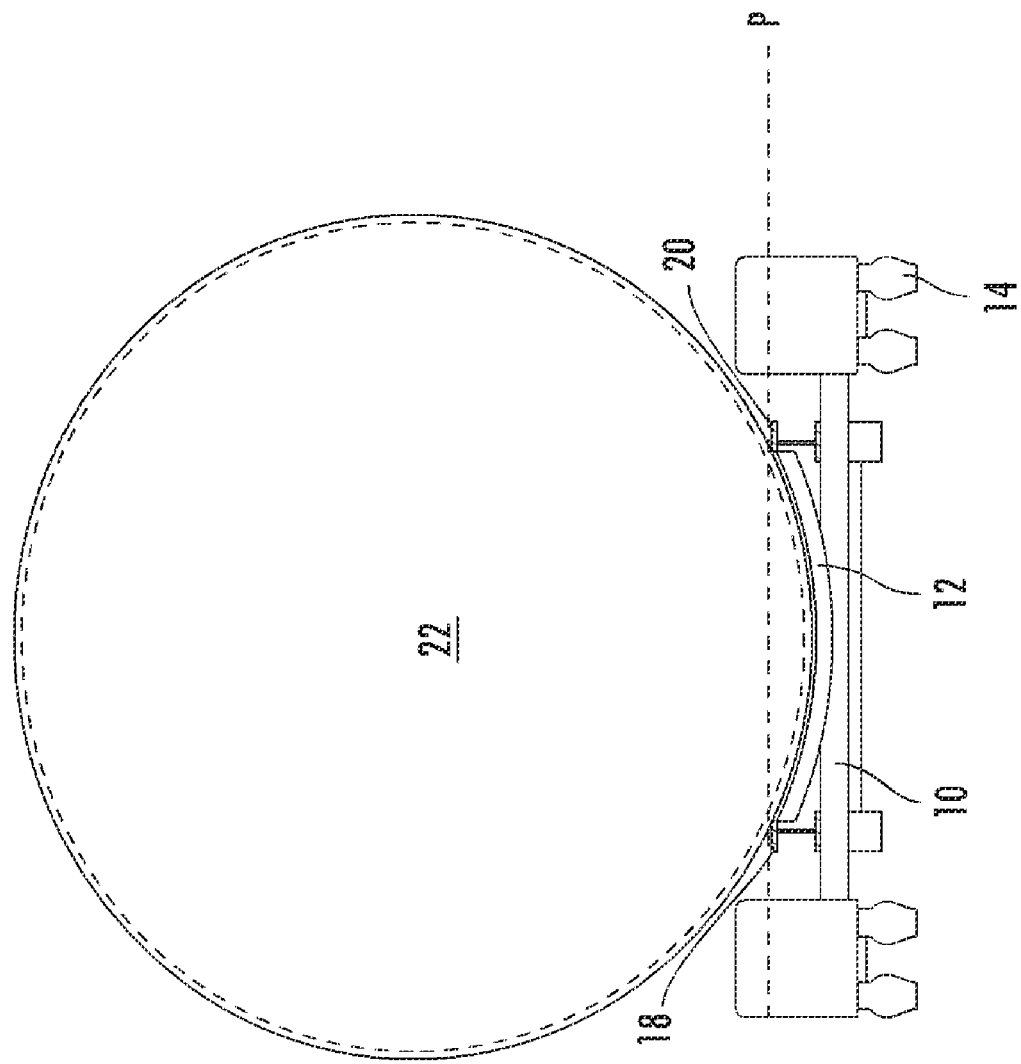
FIG. 2 is an end view of the dolly trailer having a large cylindrical object carried thereon.

As best seen in FIG. 1, the dolly trailer frame 10 further comprises a plurality of curved support members 12 extending from the first side rail 18 member to the second side rail member 20. As seen in FIG. 2, the curved support members 12 are adapted to receive the cylindrical load 22 so that the curvature of the support members 12 is preferably the same as the curvature of the outside surface of the cylindrical load 22. This maximizes the support member 12 surface area that contacts the load 22 which helps to secure the load 22 to the dolly trailer with the help of tie-downs or other suitable securing mechanisms.

As best seen in FIG. 2, the curvature of the support members 12 is such that at least a portion of the curved support members 12 extends below the plane P created by top surface of the dolly trailer's first and second side rail members 18, 20 so that in use, at least a portion of the cylindrical load 22 is carried below this plane P. The positioning of the curved support members 12 and cylindrical load 22 below plane P allows the dolly trailer and load 22 to have a lower center of gravity, which helps to stabilize the dolly trailer. Further, the positioning of the curved support members 12 allows the load 22 to sit lower in the frame 10 which means the distance from the ground to the top of the load 22 will be shorter, and, therefore be able to be carried under more low lying obstacles such as bridges and power lines.

Figure 3:
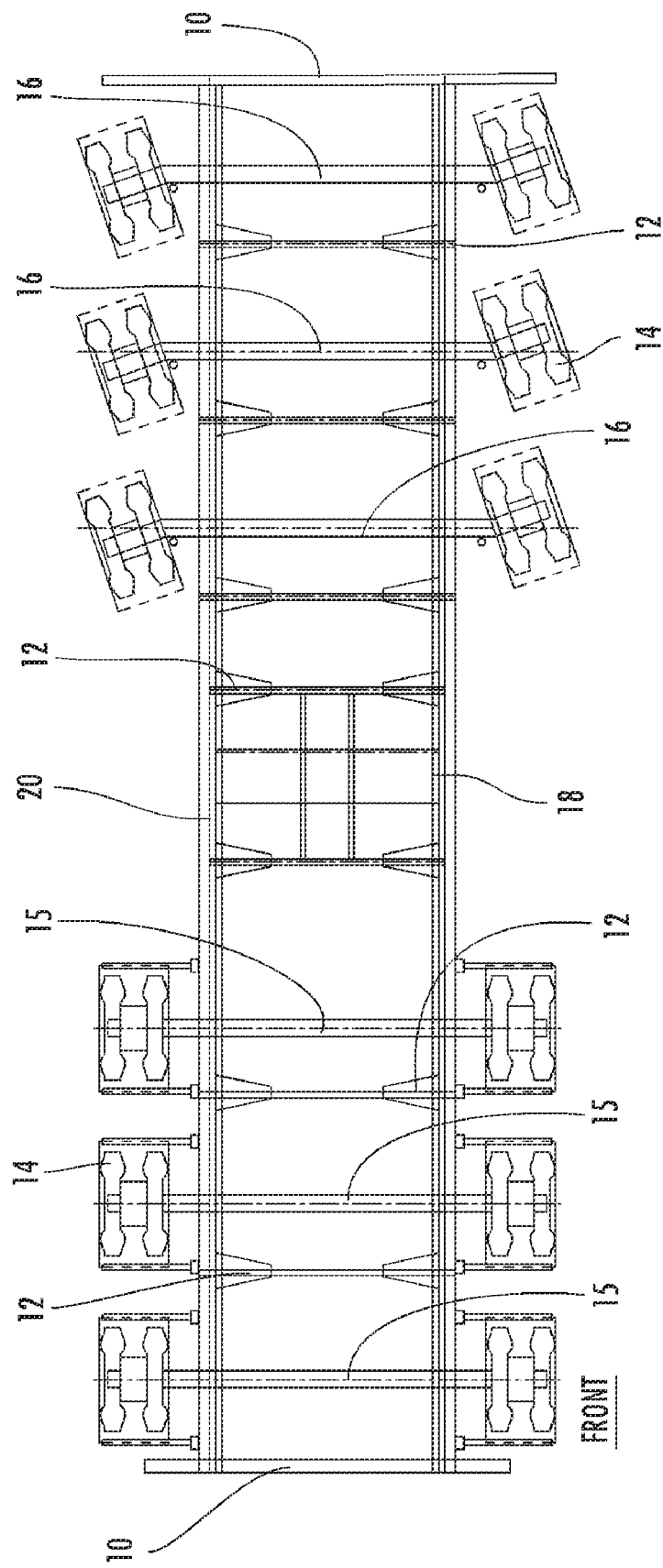
FIG. 3 is a top view illustrating the pivot of the rear caster axles.

The dolly trailer preferably comprises six axles 15, 16, each having wheels 14 combined thereto. The axles 15, 16 are adapted to evenly support an extremely heavy load 22 such as a tower used to support an energy generating windmill. As seen in FIG. 3, the dolly trailer preferably comprises three regular axles 15 positioned closer to the front of the dolly trailer and three caster axles 16 positioned closer to the rear of the dolly trailer. FIG. 3 illustrates the ability of the caster axles 16 to pivot as the dolly trailer is pulled through a turn which allows the dolly trailer to have a shorter turning radius. Preferably, the caster axles 16 can pivot twenty degrees in both the right and left direction.

When there is no load 22 being carried by the dolly trailer, the caster axles 16 can be locked in their straight position so that they are no longer allowed to pivot. This locking feature helps to reduce wear on the axles 16 when they are not necessarily needed to help the dolly trailer function. The caster axles 16 are not necessary when there is no load 22 on the dolly trailer because the length from the prime mover vehicle to the end of the dolly trailer is significantly shorter when there is no load 22, as is further discussed below and shown by comparing FIG. 5 with FIG. 6. The shorter length does not require the pivoting caster axles 16 to help shorten turning radius.

In addition to shortening the turning radius, the caster axles 16 also help reduce the lateral loads on the frame 10. In other words, when an extremely heavy load is being pulled through a turn on a trailer without caster axles 16, there is a large amount of lateral force put on the rear axles due to the inertia of the load 22, i.e. since the load 22 wants to continue traveling in a straight line. The caster axles 16 on the dolly trailer of the present invention help to reduce this lateral force by allowing the wheel 14 portion of the axle 16 to pivot with the inertia of the load 22 thereby reducing the lateral force on the frame 10 and axles 16. Without the caster axles 16 reducing the lateral force of the load 22, the axles or frame 10 would likely bend or brake.

Figure 5:
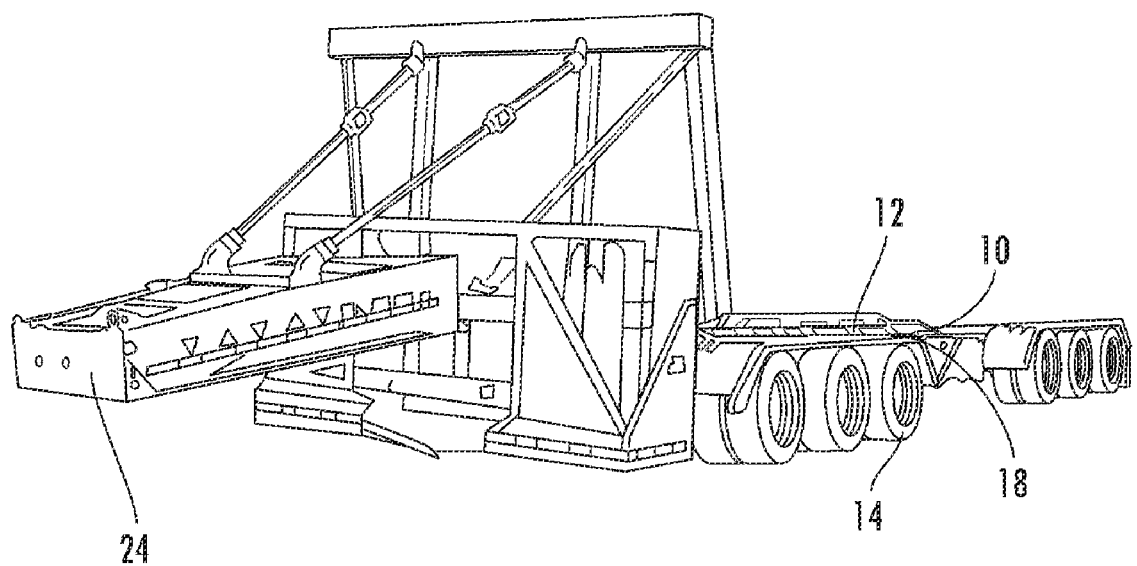
FIG. 5 is a perspective view of the dolly trailer having a hitch means for connecting the dolly trailer or the load to a prime mover vehicle.
Figure 6:
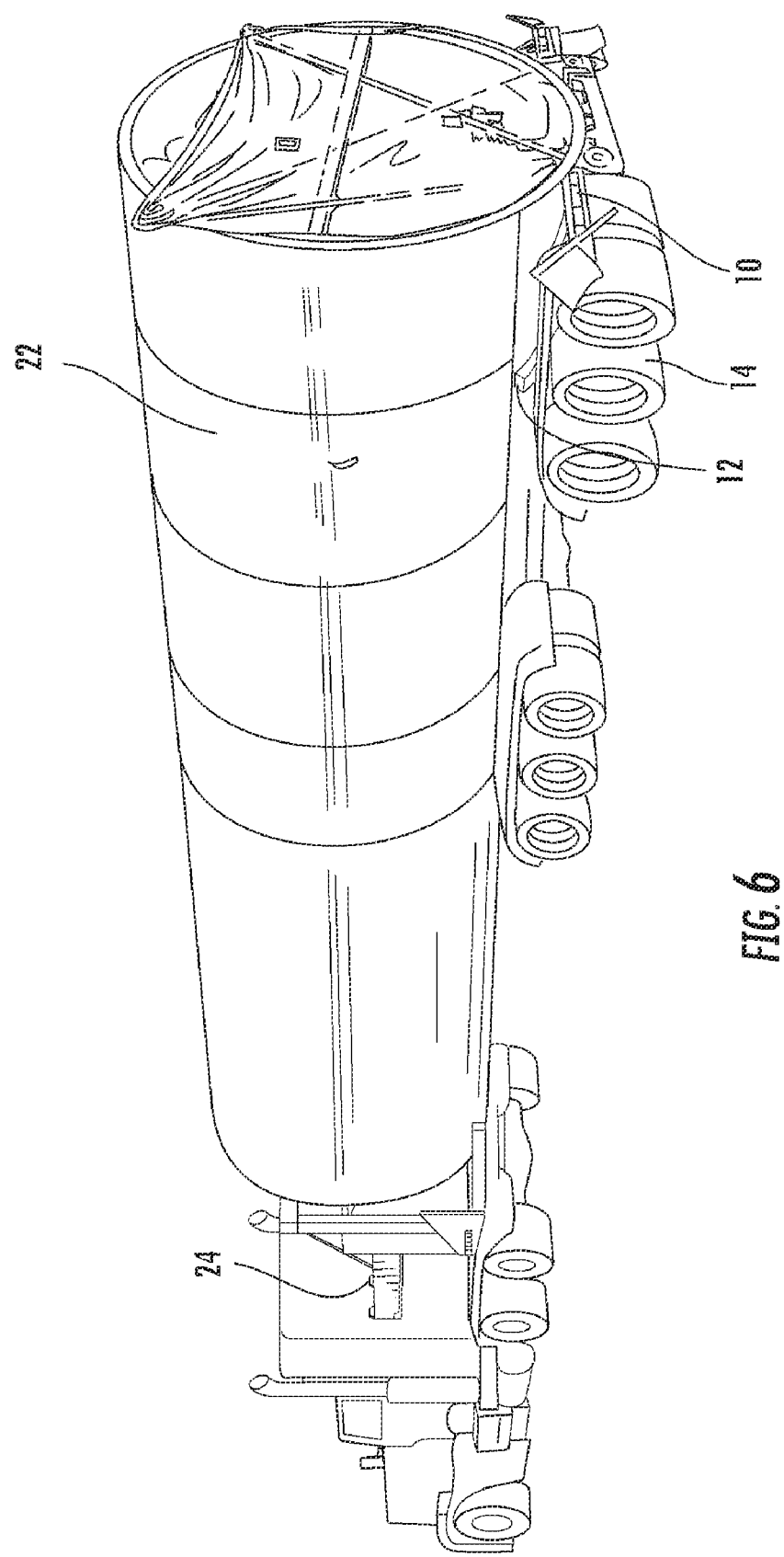
FIG. 6 is a perspective view of the dolly trailer wherein the hitch is combined with the load.

FIGS. 5 and 6 shows an example of a hitch means 24 that can be used with the present invention. The hitch means 24 is adapted to combine with a prime mover vehicle such as a tractor truck. When the dolly trailer is not carrying a load 22, the hitch means 24 is combined directly with the dolly trailer frame 10, as shown in FIG. 5. When not carrying a load 22, the front axles 15 can be raised off of the ground by removing the air from the axles 15 and chaining the axles 15 up off of the ground. Further, the hitch means 24 is such that when it is combined with a prime mover vehicle, it lifts the front portion of the dolly trailer off of the ground to further the distance between the front axles 15 and the ground. With the front axles 15 off of the ground, the dolly trailer can be pulled like a regular semi-trailer in that only the wheels 14 on its rear axles 16 make contact with the ground. As discussed above, the caster axles 16 can be locked in their straight configuration so they do not pivot when no load 22 is being carried by the dolly trailer.

Figure 4:
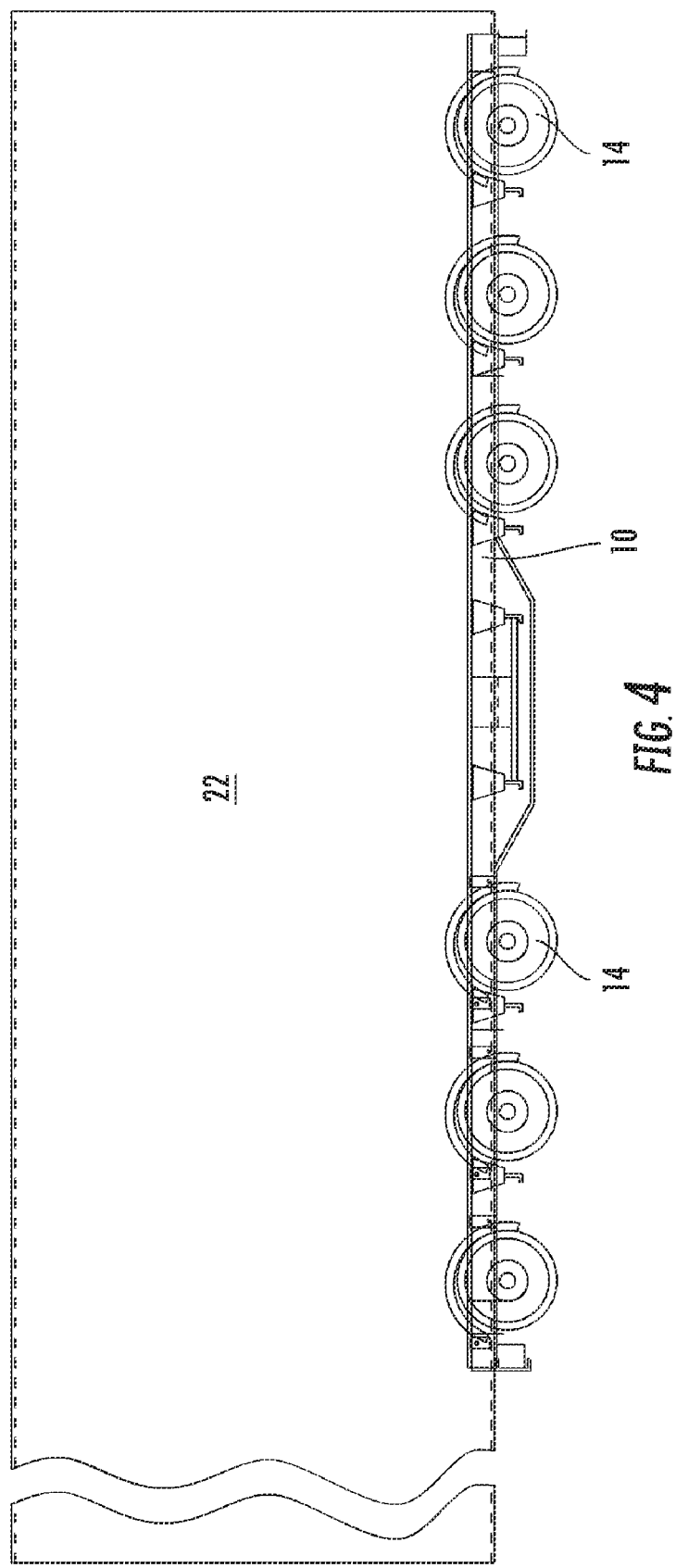
FIG. 4 is a side view showing the dolly trailer carrying a large cylindrical object.

As shown in FIG. 6, when the dolly trailer is carrying a load 22, the hitch means 24 is removed from the frame 10 of the dolly trailer and combined with the front portion of the load 22. As seen in FIGS. 4 and 6, the hitch means 24 cannot be combined with the dolly trailer when the dolly trailer is carrying a load 22 because the excess length of the load 22 is carried in front of the dolly trailer rather than behind the dolly trailer. When a load 22 is on the dolly trailer, the hitch means 24 is combined with the load 22 by any suitable means, and the load 22 is secured to the dolly trailer by tie downs or any other suitable mechanism. In this arrangement, the prime mover vehicle pulls the load 22 which is supported by the dolly trailer.

The dolly trailer further comprises an air ride suspension system which allows the user to raise and lower the height of the dolly trailer by adding or removing air in the suspension system. The removal of air from the suspension system can be beneficial if the dolly trailer and load 22 needs to be lowered a few inches to fit under an obstacle. Similarly, the addition of air into the suspension system can be beneficial if additional suspension is needed to traverse rough ground, such as rail road tracks.

Having thus described the invention in connection with the preferred embodiments thereof, it will be evident to those skilled in the art that various revisions can be made to the preferred embodiments described herein with out departing from the spirit and scope of the invention. It is my intention, however, that all such revisions and modifications that are evident to those skilled in the art will be included with in the scope of the following claims.

What is claimed is:

1. A dolly trailer assembly for supporting the weight of a cylindrical load and for transporting the load over a highway with a prime mover vehicle, said dolly trailer assembly comprising:
   a frame having a first side rail member and a second side rail member;
   a hitch having a first end and second end, wherein the first end is adapted to be combined with the prime mover vehicle and the second end has a first attachment configuration in which the second end is adapted to combine with the frame and a second attachment configuration in which the second end is adapted to combine with the load;
   at least one axle combined with the frame, said axle having load bearing wheels combined therewith;
   a plurality of curved support members extending between the first and second side rail members;
   wherein the cylindrical load is carried by the curved support members.

2. A dolly trailer assembly for supporting the weight of a cylindrical load and for transporting the load over a highway with a prime mover vehicle, said dolly trailer assembly comprising:
   a frame having a front end, a back end, a first side rail member, and a second side rail member, wherein each side rail member has a top surface;
   a hitch adapted to combine the prime mover vehicle with the cylindrical load;
   a fixed axle combined with the frame and a caster axle combined with the frame wherein the caster axle is combined with the frame behind the fixed axle, wherein each axle is combined with load bearing wheels, and wherein the caster axle is a locking caster axle so that the position of its wheels can be locked at a desired angle;
   a plurality of curved support members extending between the first and second side rail members so that a portion of the curved support members is below the top surface of the first and second side rail members;
   wherein the cylindrical load is carried by the curved support members so that at least a portion of the load is carried below the top surface of the first and second side rail members.

3. The dolly trailer of claim 2 wherein at least a portion of the load is carried in-between the first and second side rail members.

4. The dolly trailer assembly of claim 2 further comprising an air ride suspension system.

5. The dolly trailer assembly of claim 2 wherein the hitch is further adapted to combine the dolly trailer with the prime mover vehicle.

6. A dolly trailer assembly for supporting the weight of a cylindrical load and for transporting the load over a highway with a prime mover vehicle, said dolly trailer assembly comprising:
- a frame having a first side rail member and a second side rail member;
- a hitch having a first end and a second end, wherein the first end is adapted to be combined with the prime mover vehicle and the second end has a first attachment configuration in which the second end is adapted to combine with the frame and a second attachment configuration in which the second end is adapted to combine with the load;
- a fixed axle combined with the frame and a caster axle combined with the frame wherein the caster axle is combined with the frame behind the fixed axle and wherein each axle is combined with load bearing wheels; and
- a plurality of curved support members extending between the first and second side rail members adapted to carry the cylindrical load.

7. The dolly trailer of claim 6 wherein the caster axles is a locking caster axle so that the position of its wheels can be locked at a desired angle.

8. The dolly trailer assembly of claim 6 further comprising three front axles and three rear axles wherein the three rear axles are caster axles.

9. The dolly trailer of claim 6 further comprising an air ride suspension system.

10. The dolly trailer of claim 6 wherein the cylindrical load is carried by the curved support members so that at least a portion of the load is carried below the top surface of the first and second side rail members.

11. A dolly trailer assembly for supporting the weight of a cylindrical load and for transporting the load over a highway with a prime mover vehicle, said dolly trailer assembly comprising:
- a frame having a front end, a back end, a first side rail member, and a second side rail member, wherein each side rail member has a top surface;
- a hitch adapted to combine the prime mover vehicle with the cylindrical load;
- three fixed axles combined with the frame and three caster axles combined with the frame wherein the caster axles are combined with the frame behind the fixed axles and wherein each axel is combined with load bearing wheels;
- a plurality of curved support members extending between the first and second side rail members so that a portion of the curved support members is below the top surface of the first and second side rail members;
- wherein the cylindrical load is carried by the curved support members so that at least a portion of the load is carried below the top surface of the first and second side rail members.

* * * * *

UNITED STATES PATENT AND TRADEMARK OFFICE
CERTIFICATE OF CORRECTION

PATENT NO. : 7,628,418 B1  Page 1 of 1
APPLICATION NO. : 11/306938
DATED : December 8, 2009
INVENTOR(S) : Holmes et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 537 days.

Signed and Sealed this

Second Day of November, 2010

David J. Kappos
*Director of the United States Patent and Trademark Office*